United States Patent
Hoenninger et al.

(10) Patent No.: US 6,208,267 B1
(45) Date of Patent: Mar. 27, 2001

(54) INDICATING DEVICE FOR AN ELECTRONIC BACKUP AID

(75) Inventors: Anton Hoenninger, Lauda-Koenigshofen; Karl Kuebler, Freiberg, both of (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 09/213,231

(22) Filed: Dec. 17, 1998

(30) Foreign Application Priority Data

Dec. 17, 1997 (DE) .............................. 197 56 063

(51) Int. Cl.$^7$ .................................................. B60Q 1/48
(52) U.S. Cl. ...................... 340/932.2; 340/435; 340/436; 116/28 A
(58) Field of Search .................. 340/932.2, 435, 340/436, 480–490; 116/42, 46, 51, 52, 28 A

(56) References Cited

U.S. PATENT DOCUMENTS 4,152,694 * 5/1979 Toles ..................................... 340/480

5,500,642 * 3/1996 Battle ................................ 340/932.2

FOREIGN PATENT DOCUMENTS

| 1 036 720 | 8/1958 | (DE) . |
|---|---|---|
| 1 815 671 | 6/1970 | (DE) . |
| 38 36 095 A1 | 4/1990 | (DE) . |
| 39 02 627 A1 | 8/1990 | (DE) . |
| 40 14916 A1 | 11/1991 | (DE) . |
| 42 13 516 C1 | 2/1993 | (DE) . |
| 44 13 886 C1 | 4/1995 | (DE) . |
| 197 07 468 A1 | 9/1997 | (DE) . |
| 196 25 960 A1 | 1/1998 | (DE) . |
| 7-42728 | 8/1995 | (JP) . |

* cited by examiner

*Primary Examiner*—Daryl Pope
(74) *Attorney, Agent, or Firm*—Evenson, McKeown, Edwards & Lenahan, P.L.L.C.

(57) ABSTRACT

In an indicating device for an electronic backup aid, is arranged in the rear area of the vehicle in the driver's field of vision on a holding device. The holding device is vertically adjustable between at least two end positions.

10 Claims, 2 Drawing Sheets

INDICATING DEVICE FOR AN ELECTRONIC BACKUP AID

BACKGROUND AND SUMMARY OF THE INVENTION

This application claims the priority of 197 56 063.6, filed Dec. 17, 1997, the disclosure of which is expressly incorporated by reference herein.

The invention relates to an indicating device for an electronic backup aid in which an indicating device is arranged in the rear area of the vehicle in a driver's field of vision.

Electronic backup aids are used to help the driver by warning him of possible obstacles. For this purpose, sensors arranged in the rear area of the vehicle are used to determine the distance to the detected obstacles. The signals of these sensors are analyzed by an electronic analyzing and/or control system, and a visual and/or acoustic indicating device is controlled by the electronic analyzing and control system to warn the driver.

An indicating device of this type for an electronic backup aid is known from the article "Helpful Echo", mot Technik, May 5, 1992, which describes an electronic backup aid in which the indicating device is fastened by means of a bow in the rear window area of the vehicle interior on the roof. This arrangement has the disadvantage that the indicating device for an electronic backup aid can be covered, for example, by occupants in the rear, and therefore cannot be seen by the driver when backing up. In addition, it cannot be implemented in open vehicles which have removable roofs.

It is therefore an object of the invention to improve the visibility of an indicating system of the above-mentioned type, for an electronic backup aid.

This and other objects and advantages are achieved by the arrangement according to the invention, by providing in the rear area of a motor vehicle, a vertically adjustable holder for the indicating device of an electronic backup aid, which holder can be moved, as required, between two end positions. The indicating device comprises a housing and at least one indicating element. The controller of the vertically adjustable holder can be constructed such that the holder is moved only as required, for example after engaging the reverse gear, from an initial position into an operative position or into the driver's field of vision. The movement into the driver's field of vision is implemented, for example, by folding-down the holder (if the holder is fastened to the roof construction), or by erecting or folding-up the holder (if it is fastened in the area of the rear window shelf).

In addition, it is conceivable to continuously control the movement of the holder between the initial position and the operative position. As a result, the driver can then stop the movement of the holder as soon as the indicating device appears in his field of vision.

In a simple embodiment of the invention, the holder is moved manually between the at least two end positions. In this manner, the driver's field of vision during driving is not impaired by the holder, for example when looking into the interior rear view mirror.

In an advantageous embodiment of the housing and the at least one indicating element of the indicating device for an electronic backup aid, the indicating device can be read by the driver in the initial position (as well as in the operative position) of the vertically adjustable holder. This is achieved, or example, by arranging at least one indicating element on a part of the housing front side facing the driver, which is constructed as a sloped surface. Here, the at least one indicating element can be constructed, for example, as a light-emitting diode with a curved transparent covering projecting beyond the housing for enlarging the indicating area.

In an additional advantageous embodiment of the invention, vertically adjustable devices which already exist in the rear area of the vehicle are used as the holder for the indicating device for an electronic backup aid and thus perform a double function.

In a particularly advantageous embodiment of the invention, in the case of open vehicles, the indicating device for an electronic backup aid is arranged on a rollover protection device (such as a rollover bar) which can be moved from an initial position into an operative position. For example, when the indicating device is covered by persons and/or objects, the rollover protection device can be moved by the driver from an initial position into an operative position. As a result, in the operative position of the rollover protection devices, the indicating device becomes easily visible to the driver. Such movable rollover protection devices are known from various vehicle types of the applicant (compare R 129 "SL"). The rollover protection device can be moved by the driver by continuously operating a switch between the initial position and the operative position. As a result, when reversing, the driver can move the rollover protection device into a position which ensures viewing the indicating device for an electronic backup aid without difficulty. In order to permit seeing the indicating device for an electronic backup aid when also reversing (by looking into the rear view mirror), it is advantageous to arrange the indicating device in the center of the rollover protection device.

The same advantages are obtained if the indicating device for the electronic backup aid is arranged on a wind partition which can be moved between an initial position and an operative position.

In enclosed vehicles, a headrest (as used, for example, in the applicant's vehicles (compare W 210 "E-Class")), which can be moved from an initial position into an operative position, is usable as the holding device for the indicating unit. This arrangement provides the special advantage that, when the rear bench seat is occupied, the headrests are automatically erected. As a result, the indicating device, which is advantageously arranged at the upper end of the headrest, remains within the driver's field of vision. This occurs even when the rear bench seat is occupied by passengers.

The above-described embodiments all relate to movable devices arranged within the vehicle interior. However, the indicating device for an electronic backup aid can also be arranged on movable devices outside the vehicle, for example, on a rear spoiler which can be moved from an initial position into an operative position.

Other objects, advantages and novel features of the present invention will become apparent from the following detailed description of the invention when considered in conjunction with the accompanying drawings.

DETAILED DESCRIPTION OF THE DRAWINGS

Figure 1:
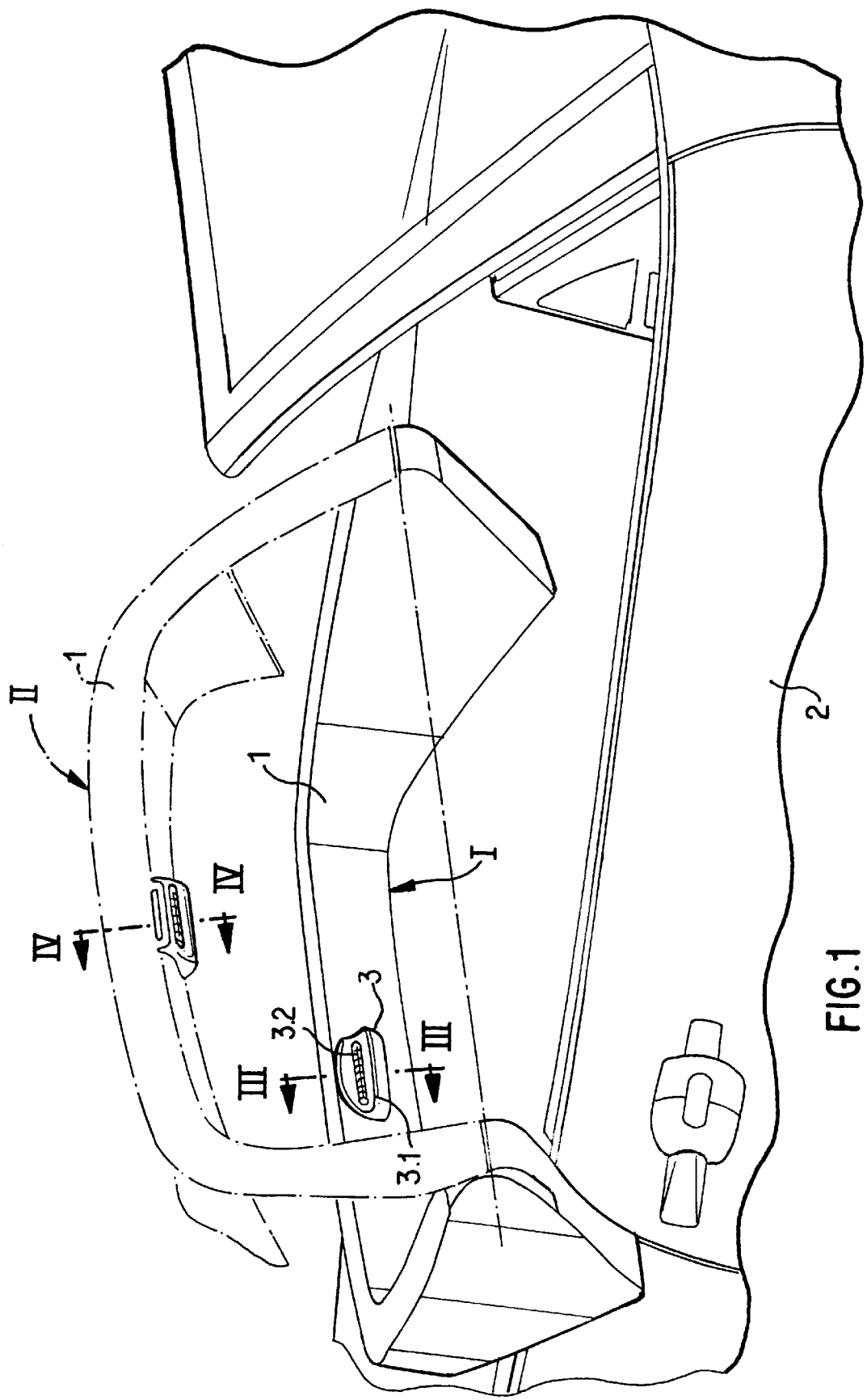
FIG. 1 is a schematic representation of a movable rollover protection device with an indicating device for an electronic backup aid.

FIG. 1 is a schematic representation of a movable rollover protection device for a motor vehicle 2 having an indicating device 3 for a backup aid. Here, the rollover protection device is constructed as a foldable rollover bar 1 and is illustrated in an initial position I, as well as in an operative position II (broken line). The indicating device 3 for an electronic backup aid comprises a housing 3.1 and several indicating elements 3.2, which are controlled by an electronic analyzing and/or control circuit (not shown) to indicate the distance of the vehicle from an obstacle. In this case, the electric connection lines between the electronic analyzing and/or control circuit and the indicating elements extend inside the rollover bar 1. As illustrated in FIG. 1, the indicating device 3 for an electronic backup aid is arranged in the center of the foldable rollover bar 1.

Figure 2:
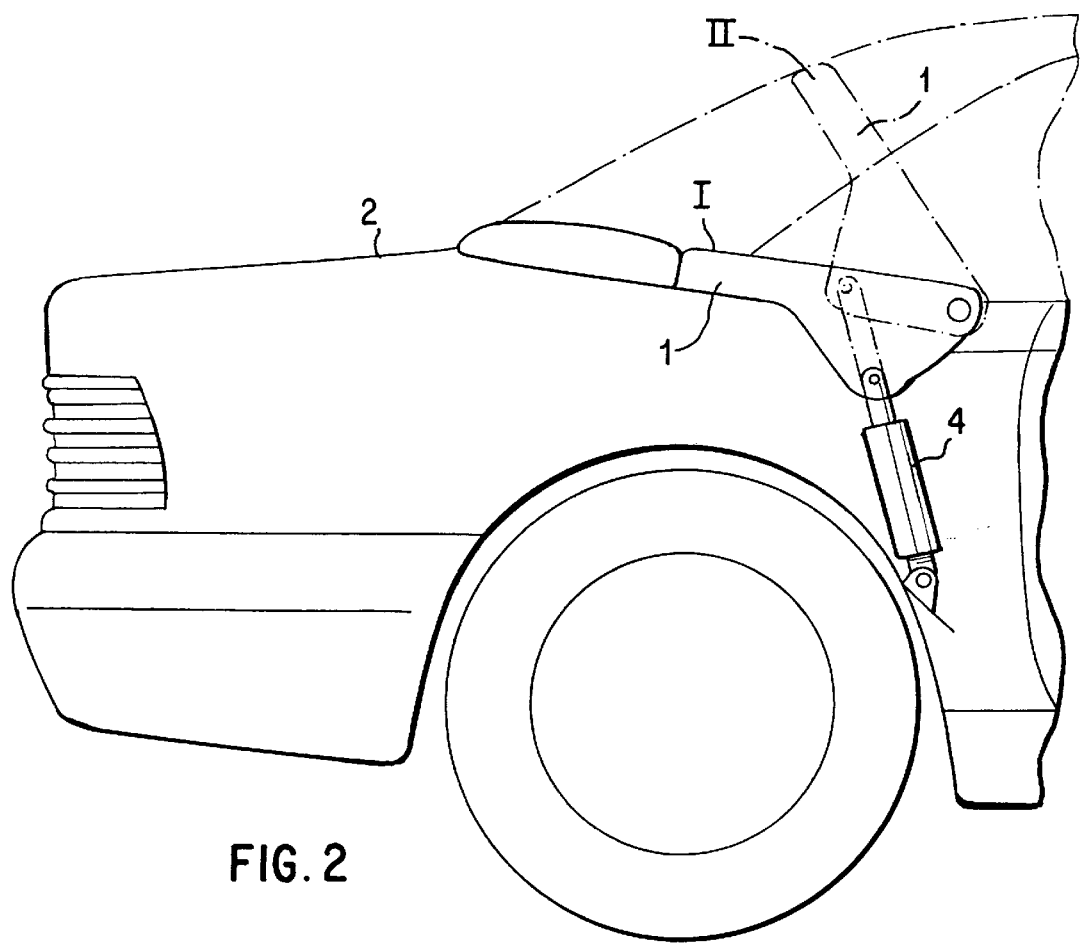
FIG. 2 is a lateral view of a movable rollover protection device.

FIG. 2 is a lateral view of the rear area of a motor vehicle 2. Here, the rollover protection device is constructed as a foldable rollover bar 1 and is moved via an adjusting device 4 (constructed as a hydraulic working cylinder) from the initial position I into an operative position II (shown by a broken line). Alternatively, the adjusting device can also be constructed as a pneumatic working cylinder or as an electric servo motor, for example. By means of a switch, which is not shown, a user can move the rollover bar 1, by means of the adjusting device 4, into any position between the initial position I and the operative position II.

Figure 3:
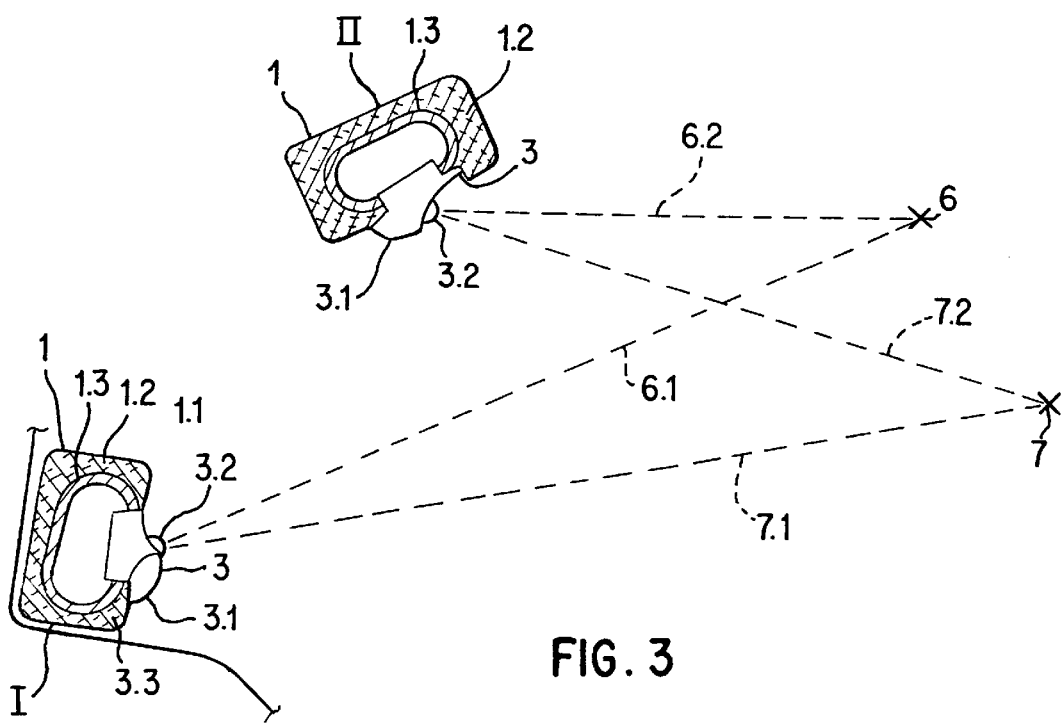
FIG. 3 is a sectional representation along the intersection Line III and IV according to FIG. 1.

FIG. 3 is a sectional representation along the intersection Lines III and IV according to FIG. 1. Here, the intersection Line III intersects the rollover bar 1 in the initial position I and the intersection Line IV intersects it in the operative position II. As illustrated in FIG. 3, the indicating elements 3.2, which are arranged on a sloped surface 3.3. of the front side of the housing 3.1 facing the driver, can be seen in the initial position I, as well as in the operative position II. This is indicated by the illustrated sight lines 6.1, 6.2, 7.1, 7.2, which connect a first eye point and a second eye point 6, 7 with the indicating device 3.

The first eye point 6 and the second eye point 7 characterize different sitting positions of the driver, the first eye point 6 corresponding to a tall driver and the second eye point 7 corresponding to a short driver. When the rollover bar 1 is in the initial position I, the sight lines 6.1 and 7.1 connect the first eye point 6 and the second eye point 7 with the indicating device 3. When the rollover bar 1 is in the operative position II (shown by a broken line), the sight lines 6.2 and 7.2 connect the first eye point 6 and the second eye point 7 with the indicating device 3.

The indicating devices are constructed as light-emitting diodes with a curved transparent covering. Here, different colors are used to represent the distance of the vehicle rear from an obstacle. In the illustrated embodiment of the invention, the housing 3.1 of the indicating device 3 for an electronic backup aid is fitted into a corresponding recess 1.1 in a bar profile 1.3 of the rollover bar 1 (as illustrated in the drawing). Here, the bar profile of the rollover bar 1 is surrounded by a cushioning 1.2 which recesses the indicating device and which may, for example, be constructed as surrounding foamed material. Naturally, other methods of fastening the arrangement of the indicating device 3 on the rollover bar 1, such as snapping, screwing, gluing, or the like, can also be used.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An indicating apparatus for an electronic backup aid for a vehicle, comprising:
    a holding device mounted on said vehicle in a rear area thereof;
    an indicating element arranged on said holding device in a drivers field of vision and including visible signaling elements indicative of a distance to an obstacle situated in a rearward path of the vehicle;
    wherein the holding device for the indicating element is vertically adjustable between at least two end positions.

2. The indicating apparatus according to claim 1, wherein:
    the holding device is moveable continuously between said at least two end positions; and
    the indicating element is situated in the driver's field of vision in all positions of the holding device.

3. The indicating apparatus according to claim 1, wherein the indicating element is covered in an end position of the holding device.

4. The indicating apparatus according to claim 1, wherein the holding device comprises a pre-existing movable device mounted in the rear area of the vehicle.

5. The indicating apparatus according to claim 4, wherein the movable device is a rollover protection device.

6. The indicating apparatus according to claim 5, wherein the roll protection device is a rollover bar which is foldable from an initial position into an operative position.

7. The indicating apparatus according to claim 6, wherein the indicating element is arranged in a center of the roll bar.

8. The indicating apparatus according to claim 4, wherein the movable device is a wind partition which is moveable from an initial position into an operative position.

9. The indicating apparatus according to claim 4, wherein the movable device is a headrest which is foldable from an initial position into an operative position.

10. The indicating apparatus according to claim 4, wherein the movable device is a rear spoiler which is moveable from an initial position into an operative position.

* * * * *